United States Patent Office 3,309,932
Patented Mar. 21, 1967

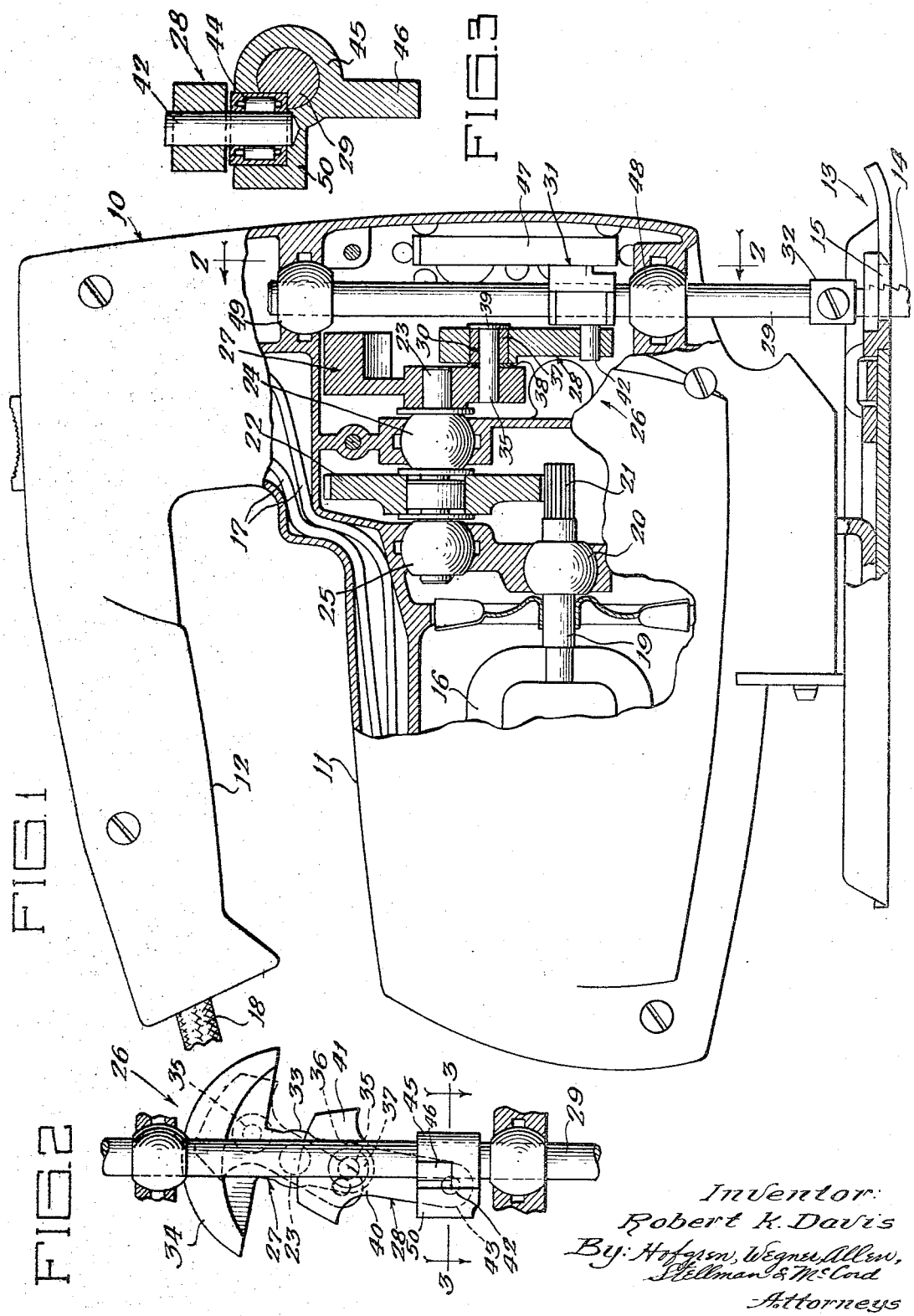

3,309,932
DRIVE MECHANISM FOR USE IN SAWS
AND THE LIKE
Robert K. Davis, St. Charles, Ill., assignor to Portable
Electric Tools, Inc., a corporation of Illinois
Filed June 4, 1964, Ser. No. 372,558
7 Claims. (Cl. 74—44)

This invention relates to power tools and in particular to power tools wherein the tool element is linearly reciprocated.

One conventional form of hand power tool comprises a saber saw wherein an elongated saw blade is carried at one end by a tool holder for linear reciprocation thereby to effect a desired sawing operation. Conventionally, the reciprocation of the tool holder is effected by means of an electric motor carried within a suitable housing of the apparatus and connected to the tool holder by means of a motion converting mechanism arranged to convert the rotary drive of the electric motor to the desired reciprocative drive of the tool holder. The present invention comprehends an improved mechanism for converting the rotary motion to the desired linear reciprocating motion.

Thus, a principal object of the present invention is the provision of a new and improved tool apparatus.

Another object of the invention is the provision of such a tool apparatus comprising new and improved means for converting rotary drive motion to a linearly reciprocating motion of the tool holder.

Yet another object of the invention is the provision of such an apparatus wherein the mechanism is arranged to provide a greater speed of tool holder movement in one direction than in the opposite direction.

A further object of the invention is the provision of such an apparatus wherein the drive is selectively rotatable in opposite directions of rotation and the mechanism is arranged to provide a greater speed of motion to the tool holder in one or the other of the directions of reciprocation as a function of the direction of rotation of the drive motor.

A further object of the invention is the provision of such apparatus including a tool holder, means for guiding the tool holder for reciprocal movement along a preselected path, a driver rotatable about a first axis intersecting the path, a crank arm fixed to the driver, a connecting link having first and second spaced portions, means pivotally connecting the first portion of the link to the crank arm at a preselected distance from the first axis, and means connecting the second portion of the link to the tool holder for pivotal movement of the second portion about a second axis parallel to the first axis and spaced from the path of reciprocation of the tool holder, the connecting means precluding relative movement between the second portion and the tool holder in the direction of the path.

Still another object of the invention is the provision of such apparatus wherein the axis of pivoting of the first portion of the link on the crank arm is spaced from the axis of pivoting of the second portion of the link relative to the tool holder a distance greater than twice the distance of the axis of pivoting of the first portion of the link on the crank arm from the axis of the driver.

Other objects and advantages of the invention will be apparent from the following description taken in connection with the accompanying drawing wherein:

FIGURE 1 is a fragmentary side elevation of a saber saw provided with a drive mechanism embodying the invention;

FIGURE 2 is a fragmentary vertical section thereof taken substantially along the line 2—2 of FIGURE 1; and FIGURE 3 is a fragmentary horizontal section taken substantially along the line 3—3 of FIGURE 2.

In the exemplary embodiment of the invention as disclosed in the drawing, a power tool herein comprising for illustrative purposes a saber saw generally designated 10 is shown to include a housing 11 provided with a manipulating handle portion 12. Carried on the housing is a conventional shoe device generally designated 13 arranged to slide over the work which is to be cut by means of a saw blade 14 extending downwardly through a suitable slot 15 in the shoe device.

The operation of the saw is effected by a conventional electric motor 16 mounted within the housing 11 and energized through suitable wires 17 connected to a cable 18 extending outwardly from the handle 12. The motor includes a shaft 91 journalled in a bearing 20 and having an outboard gear 21 formed integrally therewith. Gear 21 drives a large gear 22 fixed to a stub shaft 23 journalled in the housing 11 by means of a pair of bearings 24 and 25 disposed at opposite sides of the gear 22.

Thus, shaft 23 is rotated in response to the rotation of the motor shaft 19. The present invention comprehends an improved mechanism generally designated 26 arranged to convert the rotary motion of shaft 23 to the desired reciprocating motion of the saw blade 14. More specifically, mechanism 26 includes a crank arm 27, a link 28, a tool holder slide 29, pivot means 30 connecting the crank arm to the link, pivot means 31 connecting the link to the tool holder slide, and a securing device 32 for securing the upper end of the blade 14 to the tool holder slide.

The crank arm 27 includes a center portion 33 fixed to the stub shaft 23 for rotation with the stub shaft about the longitudinally axis thereof. A first end portion 34 of the crank arm comprises a counterweight having a circular sector shape as best seen in FIGURE 2. The pivot means 30 includes a pivot pin 35 fixedly secured to the opposite end portion 36 of the crank arm 27 and extending forwardly therefrom through a bushing 37 fixed in the link 28. A steel washer 38 may be disposed about the pin 35 between the crank arm 27 and connecting link 28, as shown in FIGURE 1, and the outer end 39 of the pin 35 may define a retaining head. Thus, the pin 35 defines a pivotal axis spaced from the axis of rotation of the stub shaft 23 a preselected distance and moving in a circular path about the axis of the stub shaft 23 as the crank arm 27 is rotated.

The bushing 37 is mounted in a first end portion 40 of the link 28, which end portion is circumferentially enlarged at 41 to define a supplemental counterweight. A pivot pin 42 is fixed to the opposite end portion 43 of the connecting link 28 and projects forwardly therefrom into a roller bearing device 44 of the pivot means 31. The roller bearing device 44 is carried in a collar 45 fixedly secured to the tool holder slide 29 and having a forwardly projecting member 46 slidably engaging a guide 47 carried on the housing 11 for maintaining the rotational position of the tool holder slide 29 whereby the saw blade 14 is maintained accurately in a single plane. The tool holder slide is slidably mounted in a pair of spaced bearings 48 and 49 carried on the housing 11 for reciprocation by mechanism 26 so as to effect the desired reciprocation of the saw blade 14 in a path defined by the straight line axis of the tool holder slide.

As best seen in FIGURES 2 and 3, the collar 45 includes an offset portion 50 for receiving the bearing 44 and pin 42 with the axis of the pin spaced laterally of the vertical axis of the tool holder slide 29. In the illustrated embodiment, the displacement of the axis of pin 42 from the axis of the tool holder slide is approximately .215 inch. As best seen in FIGURE 2, when the tool holder slide is at its lowermost extreme position, the link 28 is disposed at a small angle to the vertical plane, and more specifically, the plane defined by the axis of pin 42 and the axis of pin 35 is at an angle of approximately 9° to the vertical plane defined by the axis of the slide 29 and the axis of the stub shaft 23 which is perpendicular to and intersects the axis of the slide 29. As further shown in FIGURE 2, when the tool holder slide is in its extreme uppermost position, the link 28, as shown in dotted lines, is in an upper position wherein the link is inclined at a somewhat greater angle to the vertical, and more specifically, the plane defined by the axes of the pin 42 and pin 35 is inclined at an angle of approximately 30° to the vertical plane defined by the axes of the slide 29 and the stub shaft 23.

Thus, assuming that the direction of rotation of the motor 16 is such as to cause a clockwise rotation of the crank arm 27, as seen in FIGURE 2, there will be approximately 201° of movement of the crank arm during the upward movement of the tool holder slide 29 from its lowermost position to its uppermost position. Resultingly, there will be a rotation of the crank arm 27 of approximately 159° during the movement of the tool holder slide 29 from its uppermost position to its lowermost position. Thus, it may be seen that the tool holder slide will move more slowly upwardly than downwardly whereby a relatively slow cutting speed is obtained. However, by providing electric motor 16 as a reversing motor, suitable reverse rotation of the motor to effect a counterclockwise rotation of the crank arm 27, as seen in FIGURE 2, will cause the 159° portion of the movement of the tool holder slide to correspond to the upward movement thereof and the 201° portion of the motion to correspond to the downward movement thereof whereby a relatively high speed cutting operation is effected. It should be noted that in each case the return speed of the tool holder slide is complementary to the cutting speed, that is the same total amount of time for a complete reciprocation of the saw blade is provided with the cutting time being selectively increased or decreased as a function of the direction of rotation of the motor 16.

As seen in FIGURE 2, in the illustrated arrangement of the mechanism 26, the pin 35 reciprocates between a position to the left of the vertical plane of the axis of the tool holder slide 29 at the lowermost position of the tool holder slide and to the right of this plane when the tool holder slide is in its uppermost position. Further, it should be noted that the counterweight 41 is roughly 180° out of phase in its rotational position relative to the counterweight 34, thereby effectively counterbalancing the lateral vibrations introduced by the counterweight 34.

While I have shown and described one embodiment of my invention, it is to be understood that it is capable of many modifications. Changes, therefore, in the construction and arrangement may be made without departing from the spirit and scope of the invention as defined in the appended claims.

I claim:

1. Apparatus comprising: a tool holder; means for guiding said tool holder for reciprocal movement along a preselected path; a driver rotatable selectively in opposite directions of rotation about a first axis intersecting said path; a crank arm fixed to said driver; a connecting link having first and second spaced portions; means pivotally connecting said first portion of said link to the crank arm at a preselected distance from said first axis; and means connecting said second portion of said link to said tool holder for pivotal movement of said second portion about a second axis parallel to said first axis and spaced from said path of reciprocation of said tool holder, said connecting means precluding relative movement between said second portion and said tool holder in the direction of said path.

2. Apparatus comprising: a tool holder; means for guiding said tool holder for reciprocal movement along a preselected path; a driver rotatable about a first axis intersecting said path; a crank arm fixed to said driver; a connecting link having first and second spaced portions; means pivotally connecting said first portion of said link to the crank arm at a preselected distance from said first axis; and means connecting said second portion of said link to said tool holder for pivotal movement of said second portion about a second axis parallel to said first axis and spaced from said path of reciprocation of said tool holder, said connecting means precluding relative movement between said second portion and said tool holder in the direction of said path.

3. The apparatus of claim 2 wherein said path comprises a straight line and said first axis is perpendicular to said line.

4. Apparatus comprising: a tool holder; means for guiding said tool holder for reciprocal movement along a preselected straight line in a preselected plane; a driver rotatable about a first axis in said plane; a crank arm fixed to said driver; a connecting link having first and second spaced portions; means pivotally connecting said first portion of said link to the crank arm at a preselected distance from said first axis; and means connecting said second portion of said link to said tool holder for pivotal movement of said second portion about a second axis parallel to said first axis and spaced from said plane and defining with said first axis a second plane intersecting said preselected plane at an angle of approximately 9° when the tool holder is at one extreme of its reciprocal movement, said connecting means precluding relative movement between said second portion and said tool holder in the direction of said line.

5. The apparatus of claim 4 wherein the axis of pivoting of said first portion of the link relative to said crank arm defines with said first axis a third plane intersecting said preselected plane at an angle of approximately 30° from the opposite side of said preselected plane when the tool holder is at the opposite extreme of its reciprocal movement.

6. Apparatus comprising: a tool holder; means for guiding said tool holder for reciprocal movement along a preselected line; a driver rotatable about a first axis; a crank arm fixed to said driver and having a counterweight means spaced from said axis; a connecting link having first and second spaced portions and second counterweight means adjacent said first portion having less mass than the counterweight means of said crank arm; means pivotally connecting said first portion of said link to the crank arm at a preselected distance from said first axis diametrically opposite said counterweight means of the crank arm; and means connecting said second portion of said link to said tool holder for pivotal movement of said second portion about a second axis parallel to said first axis and spaced from said line of reciprocation of said tool holder, said connecting means precluding relative movement between said second portion and said tool holder in the direction of said line.

7. Apparatus comprising: a tool holder; means for guiding said tool holder for reciprocal movement along a preselected substantially straight line; a driver rotatable about a first axis; a crank arm fixed to said driver; a connecting link having first and second spaced portions; means pivotally connecting said first portion of said link to the crank arm for pivotal movement of said first portion about a second axis spaced from said first axis; means connecting said second portion of said link to said tool holder for pivotal movement of said second portion about a third axis parallel to said first axis, said connecting means precluding relative movement between said second portion and said tool holder in the direction of said line, said line extending at an angle to the plane defined by said first and third axes to provide a difference in the speed of the tool holder movement in one direction of said reciprocal movement from the speed thereof in the other direction; and means for rotating said driver selectively in opposite directions of rotation about said first axis whereby the greater speed of movement of the tool holder is selectively said one direction or said other direction corresponding to the selected direction of rotation of said driver.

References Cited by the Examiner

UNITED STATES PATENTS

| | | | |
|---|---|---|---|
| 1,138,892 | 5/1915 | Roberts | 74—44 |
| 1,279,462 | 9/1918 | Siegel | 74—44 |
| 2,350,334 | 6/1944 | Baker | 74—44 |
| 2,573,753 | 11/1951 | Young et al. | 74—44 |
| 2,961,016 | 11/1960 | Papworth | 143—68 |

FRED C. MATTERN, JR., *Primary Examiner.*

F. E. BAKER, *Assistant Examiner.*